United States Patent [19]
Geisseler

[11] Patent Number: 5,021,149
[45] Date of Patent: Jun. 4, 1991

[54] PROCESS AND DEVICE FOR PROCESSING GRANULATED MATERIALS

[75] Inventor: Max Geisseler, Ettenhausen, Switzerland

[73] Assignee: Aspa Zürich AG, Zürich, Switzerland

[21] Appl. No.: 373,523

[22] Filed: Jun. 30, 1989

[30] Foreign Application Priority Data

Jul. 1, 1988 [CH] Switzerland ............... 2515/88

[51] Int. Cl.$^5$ .................... B07B 7/02; B23K 9/18
[52] U.S. Cl. ........................ 209/141; 209/2; 209/143; 219/73.2; 228/20 R
[58] Field of Search ............. 209/141, 143, 146, 149, 209/2, 140; 51/425; 219/73.2, 73.21; 228/20 R

[56] References Cited

U.S. PATENT DOCUMENTS

| | | | |
|---|---|---|---|
| 921,374 | 5/1909 | Donovan | 209/141 |
| 1,850,719 | 3/1932 | Herz | 209/141 X |
| 2,968,400 | 1/1961 | Clute | 209/143 |
| 3,354,923 | 11/1967 | Voller | 209/143 |
| 4,221,957 | 9/1980 | Barger et al. | 219/73.2 |
| 4,342,897 | 8/1982 | Murai et al. | 219/73.2 |

FOREIGN PATENT DOCUMENTS 249677 11/1986 Japan ................... 219/73.2

Primary Examiner—Donald T. Hajec
Attorney, Agent, or Firm—Rothwell, Figg, Ernst & Kurz

[57] ABSTRACT

A process and a device are used to process granulated materials such as abrasives for centrifugal wheel cleaning systems or welding powder for welding machines. Operation is based on the suction principle; an adjustable amount of ambient air is drawn in to be used as the conveying air for the granulated material and takes the latter to the processing device. A part of this conveying air is also used to separate foreign bodies from the granulated material. Granulated material and conveying air flow in a stream of material which gradually grows wider and thinner, to an accumulation point from which they trickle in the form of a screen to a hopper. In the process the other portion of conveying air flows through them. The ambient air that is drawn in may also be used to remove dust from an operating compartment before it is used as conveying air. Negative pressure prevails throughout the system to prevent particulate escape into the environment.

10 Claims, 2 Drawing Sheets

PROCESS AND DEVICE FOR PROCESSING GRANULATED MATERIALS

BACKGROUND OF THE INVENTION

1. Field of the Invention

The invention relates to a process for removing impurities from granulated material such as abrasives for cleaning workpieces or powdered welding flux for welding machines, and to a device for applying this process.

2. Description of the Prior Art

In processes carried out by using granular working substances, that is, granulated materials or mixtures thereof, it is customary to circulate these materials, remove incidental impurities from them during circulation, and replace the consumed granulated materials with fresh ones.

The operation of generally known centrifugal wheel cleaning machines in which customary granulated material reprocessing plants have been employed may serve as an example. The granular cleaning agent emerges from an intermediate hopper after a hinged door has opened, falls under gravity to the centrifugal wheel and after this operation has been completed is lifted together with the impurities formed from a receiving hopper below to a granulated material cleaner, as for example by means of a bucket elevator, and is there cleaned. Of the two suction fans customarily present, one, usually mounted on the granulated material cleaner, is used to remove dust from the granulated material and the other, usually mounted on the remove dust filler, is used to remove dust from the cleaning chamber. With centrifugal wheel cleaning machines such as this, which must be shut off and opened each time a workpiece or charge is changed, fresh granulated material is introduced into the cleaning chamber manually as required to replace the granulated material consumed, while the machine is shut down.

UP welding machines are another type of generally known mechanism with circulating granular working substances. Simpler versions are usually equipped only with a granulated material or powder bin and an exhaust system. When a charge of granulated material has been introduced, operation continues for a certain amount of time, after which the welding process is interrupted and a charge of fresh granulated material is introduced manually. Such machines are unable to meet the operating requirements of modern welding systems; in addition, they produce widely varying welding flux compositions.

More complex welding systems with a fresh granulated material or fresh welding flux supply feature have thus far generally been designed as follows: the circulating welding flux is drawn upward by means of a suction fan from the welding head to a centrifugal separator in which entrained impurities are removed, and the reusable powder is introduced into a pressurized tank by way of cyclically operating charging valves. Fresh powder is also added here on the basis of consumption, and then the processed powder is separated by means of cyclically operating charging valves and taken to the welding head by a separate compressed air push feed mechanism. In addition to the costly multiple-chamber charging and discharging systems for the granulated material, that is, welding flux, costly mechanisms for drying the delivery air are also needed to prevent caking of the powder in the push feed line. Moreover, centrifugal separators which promote wear by powder abrasion and which cannot be adjusted from the viewpoint of the limiting grain size to be separated are used in this case as well. In addition, the push feed employed presents the disadvantage that the delivery air leaving the welding head constantly discharges powder dust into the environment, even if only in small amounts.

In another welding flux processing system, although suction draft feed is used to eliminate the disadvantage last mentioned, a centrifugal separator abrading the working substance and a cyclically operating charging and discharging valve are required to deliver the welding flux serving as the working substance to the welding head. This design presents the further disadvantage that the wear-promoting impurities exhausted from the welding station along with the working substance still must flow through the greater part of the cycle before they are discharged from the cycle by a second centrifugal separator.

SUMMARY OF THE INVENTION

The present invention provides an improved process of the type described in the foregoing, one by means of which removal of dust from the operating compartment, together with delivery and cleaning of the granular working substance, can be carried out in a simple and advantageous manner.

The present invention further provides a device for application of this process.

The granulated material used as a working substance flows at high speed through the mechanism together with the conveying air. The uptake is generally cylindrical and at its upper end changes into a curved pipe section in which the cross-section of the flow of material in the horizontal direction gradually becomes 4-6 times greater than the diameter of the uptake and transversely thereto decreases, also gradually, to $\frac{1}{3}-\frac{1}{2}$ of this diameter, so that the overall cross-sectional area is increased by a factor of about 1.5-4. On the following distributing chute the flow of material widens, again gradually, to 7-9 times the diameter of the uptake, and as a result a thin and greatly retarded layer reaches an accumulation point, the storage volume of which it is advantageous to have adjustable, for example, by providing the possibility of modifying the slope of a baffle plate. The granulated material trickles from the accumulation point upstream from a sloping duct by way of which the cleaning air is exhausted, and falls by gravity into an intermediate hopper.

The limiting grain size of the working substance to be separated can be adapted advantageously to the operating requirements, since both the amount of cleaning air and the thickness of the granulated material curtain may be adjusted by moving the baffle plate.

Negative pressure impeding material flow in the lower part of the working substance delivery line is eliminated preferably by means of a pressure equalization line leading to an intermediate container.

Troublefree completion of the process is promoted if a suction chamber with a constant cone-shaped pile of granulated material is formed in the granulated material storage bin by a partition and the lower end of the fresh working substance delivery line is embedded in this cone-shaped pile a certain distance corresponding approximately to the diameter of the delivery line.

Negative pressure prevails in the entire processing unit, so that no dust escapes into the environment. No special charging and discharging valve mechanisms need be provided for addition or removal of the working substance.

BRIEF DESCRIPTION OF THE DRAWINGS

Preferred embodiments of the device contemplated by the invention are described in what follows with reference to the accompanying drawings, in which.

DESCRIPTION OF THE PREFERRED EMBODIMENTS

Figure 1:
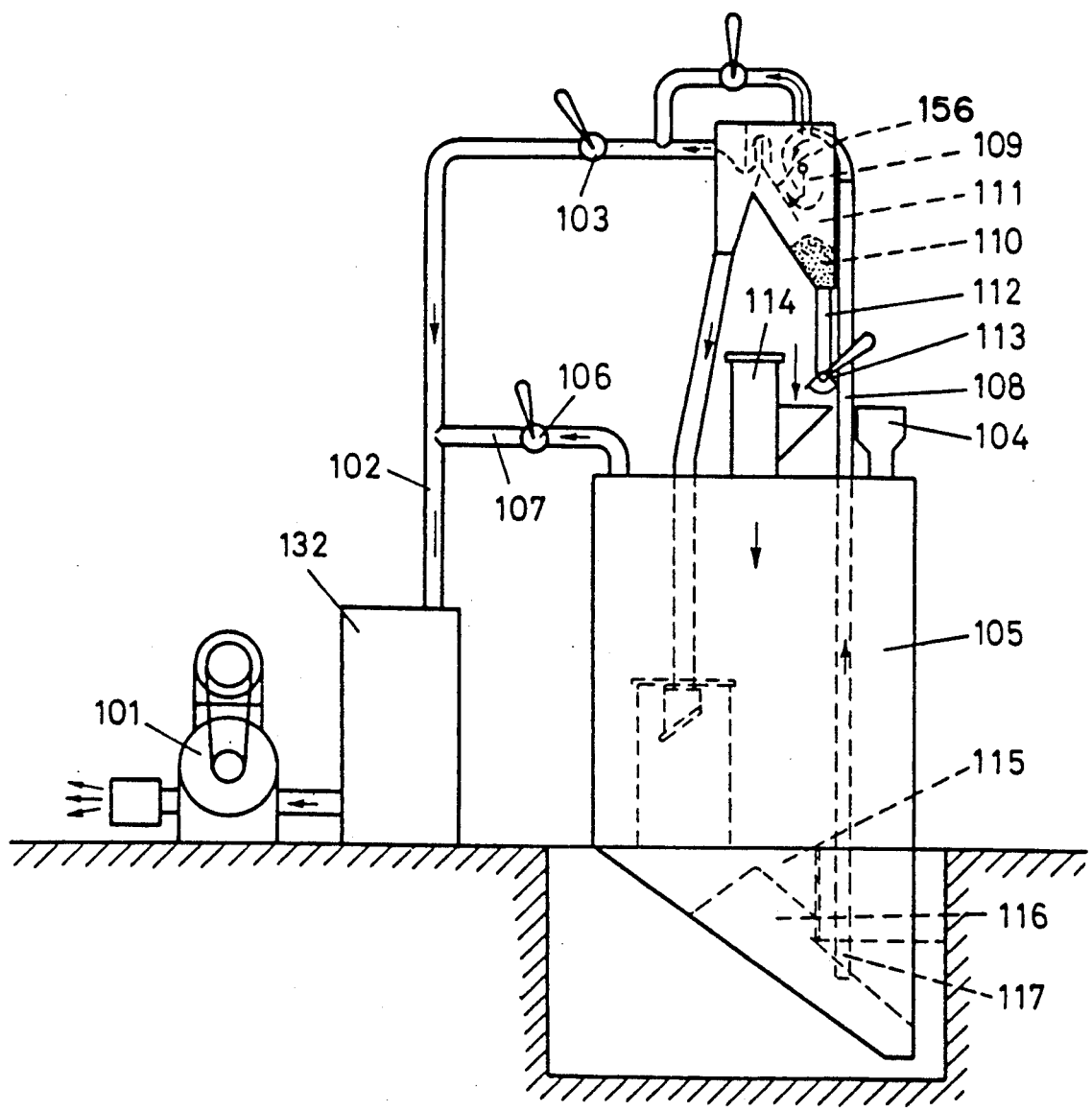
FIG. 1 shows a cross-sectional view of a device designed as a centrifugal wheel cleaning machine, in a simplified representation.

In the centrifugal wheel cleaning machine shown in FIG. 1 a suction fan 101 and a suction pipe 102 with a throttle valve 103 deliver ambient air by way of an intake pipe 104 into an operating compartment 105 and then deliver this air in part directly by way of a dust removal line 107 provided with a throttle valve 106 and in part by way of a recirculating delivery line 108 and a granulated material cleaner 109 to a fine dust separator 132. The processed working substance, granulated material, 110 flows through an intermediate hopper 111, through a feed line 112, and, after a hinged door 113 has opened, to the operating mechanism, here designed as a centrifugal wheel 114, and after its work has been completed falls into a collecting funnel 115. The used granulated material 116 is returned by the lower end 117 of the recirculating delivery line 108 extending into the material to the granulated material cleaner 109, where, as more clearly illustrated in FIG. 2, it is cleaned and returned to the cycle. A perforated plate 156 removable from the intermediate hopper 111 serves to trap any coarse impurities that might be present in the granulated material which is to be processed.

In centrifugal wheel cleaning machines such as this, which must be shut down and opened each time a workpiece and/or charge is to be changed, fresh working substance, that is, granulated material, can be poured by simple means into the cleaning chamber while operation is interrupted.

Figure 2:
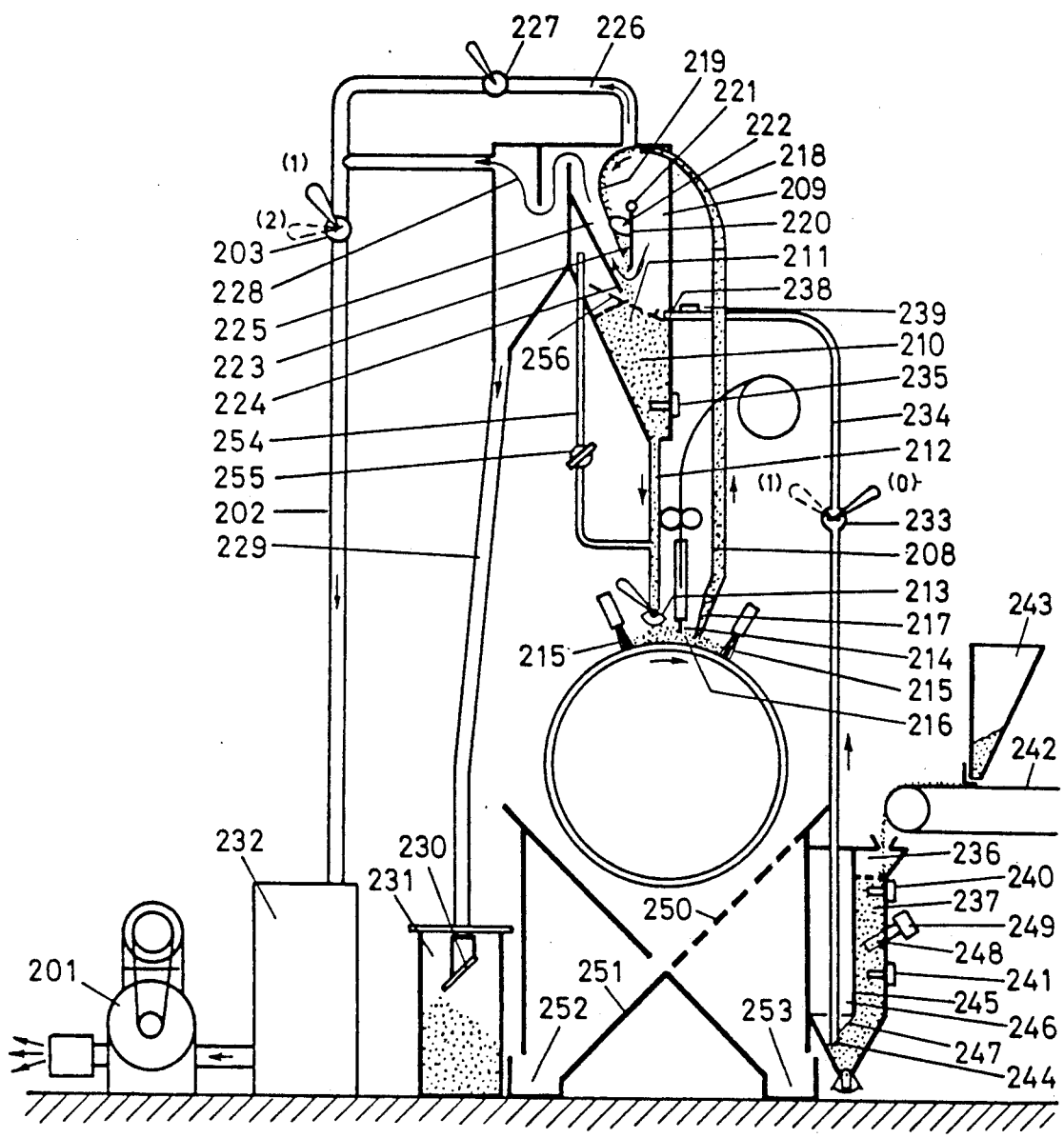
FIG. 2 shows a cross-sectional view of a second device designed as a powder welding machine, in a simplified representation.

In the of continuously-operating cleaning processes, such as centrifugal wheel descaling of rolled wire, however, fresh granulated material is added by means of the mechanism shown in FIG. 2.

The UP welding machine shown in FIG. 2 has a new welding flux processing system. Because this system operates without the surrounding working chamber, the ambient air is drawn directly by a suction fan 201 and a suction line 202 with a throttle valve 203 by way of a recirculating deliver line 208 to a granulated material cleaner 209. Processed granulated material 210 flows from an intermediate hopper 211, by way of a feed line 212, and after opening of an adjusting valve 213, which may be manually actuated, is delivered as required to the work station, that is, a welding head 214, and after it has completed its work is sucked up to the granulated material cleaner 209 from a collecting station 216, for example, one made up of wire brushes 215, into which a suction nozzle 217 is inserted. The material conveyed, consisting of conveying air and granulated material, flows at high speed through the recirculating delivery line 208 and is converted at the upper end of the line, in a curved pipe section 218 which gradually becomes wider and thinner than the diameter of line 208, to a stream of material moving approximately in the horizontal plane, and then is taken, on another and also gradually widening distributing chute 219 changing to an inclined plane, in the form of a thin and greatly retarded layer, to a baffle plate 220, in the same manner as described for FIG. 1. The slope of the baffle plate 220 can be adjusted about a horizontal axis 221, for example, by means of an externally actuatable cam. From the accumulation point 223 the granulated material falls in the form of a curtain of granulate material 224, by its own weight, back into the intermediate hopper 211. The thickness of the granulated material curtain 224 may be adjusted by moving the baffle plate 220. A portion of the impurities below a prescribed grain size limit can be blown out through the volume of screen air, which is removed by way of an inclined duct 225 and can be adjusted with the throttle valve 227 built into the bypass 226. A percentage of coarse grains can be separated from the cycle by a prior-art method in a settling chamber 228, by reducing the speed of air flow through a downpipe 229 and lapper valve 230 and can be trapped, for example in a waste bin 231. The fine dust still carried by the suction air is removed from the cycle, also by a prior-art method, in a fine dust separator 232.

During the normal delivery and cleaning process, the throttle valve 203 is in a position (1) corresponding to a particular amount of conveying air and a valve 233 in a fresh powder or fresh granulated material delivery line 234 is in the closed position (0). If the processed granulated material, that is, the welding powder 210, in the intermediate hopper has dropped to its still permissible minimum level as a result of constant consumption, with no interruption of the operating process the throttle valve 203 is set by a level sensor 235 by a prior-art method to position (2) for increase in the quantity of suction air, and at the same time the valve 233 is set to the open position (1) and as a result fresh granulated material, that is, welding powder 237, is delivered from a storage bin 236 to the intermediate hopper 211 until the material has reached the maximum level at the delivery line inlet 238 and a pressure sensor 239, for example, switches the throttle valve 203 and the valve 233 back to their initial positions.

A maximum level sensor 240 and a minimum level sensor 241 are employed in the storage bin 236, also by a prior-art method, either to announce the current levels and the corresponding refilling operations or for automatic refilling by means of a conveyor belt 242 from a storage silo 243. To ensure dependable supply independently of the instantaneous fresh powder level, that is, the fresh granulated material level, it is advisable for the lower end 244 of the delivery line to be embedded in a suction chamber 246 formed by a partition 245 and having a constant cone of material 247.

If, as in the foregoing example, caking of the welding powder is to be avoided during shutdowns, the storage bin may be equipped, for example, with an electric heating rod 248 having an appropriate temperature control system.

In any event, granulated material, that is, welding powder, falling through at the brushes or carried away with the slag can be trapped by a prior-art method separately in baths 252, 253, for example, with screens 250 and chutes 251, and can be transferred from there, by hand for example, to the storage bin or to a waste dump.

It is advisable to provide a pressure equalization line 254 with a choke 255 to offset the difference in pressure in the feed line 212 in instances where relatively great delivery heights contrast with a small column of processed granulated material.

In other cases, in which the work station and the granulated material cleaner are not positioned one above the other, the processed or consumed granulated material may be conveyed back and forth by a prior-art method, as for example, with horizontal shaker conveyor troughs or pneumatic conveyor lines.

In all cases coarse impurities present in granulated material to be processed can be trapped by a prior-art method in a perforated plate 256 removable from the intermediate hopper 211 and eliminated from the granulated material circulation.

What is claimed is:

1. A process for purifying granulated materials used in a work station, comprising the steps of:

drawing in a variable amount of ambient air as a conveying air for conveying said granulated material, a variable portion of this conveying air being used to separate non-granular particles flowing with the granulated material from the granulated material;

conveying the granulated material as a flow of material in a pipeline with a first circular cross-section, the end of said pipeline being gradually changed in shape to provide a flow of material with a second cross-section which is wider and thinner and also larger than said first cross-section, and ultimately being changed gradually, on an inclined surface, into a flow of material with a third cross-section wider than said second cross-section and in a thin, greatly retarded layer reaching an accumulation area having a variable storage volume;

trickling the flow of material down from said accumulation area in the form of a curtain through which said variable portion of the conveying air flows transversely to a storage area;

varying the grain size of the non-granular particles to be separated from the granulated material by modifying the thickness of the screen and the amount of variable portion conveying air; and delivering additional granulated material by increasing the amount of conveying air when the amount of granulated material in said storage area falls below a variable preset minimum.

2. A process as claimed in claim 1, wherein said second cross-section is horizontally 4–6 times wider and vertically 2–3 times smaller than the diameter of the first cross-section, and the width of the third cross-section is 7–9 times larger than the width of the first cross-section.

3. A process as claimed in claim 1, further including the steps of charging fresh granulated material into a storage bin and delivering the material to the work station without interruption of the cleaning process.

4. A process as claimed in claim 1, further including the step of transporting granulated material not consumed by the work station to a granulated material storage bin for reprocessing.

5. A process as claimed in claim 1, further including the step of using the ambient air drawn in to remove dust from an operating compartment through which the granulated material flows downstream from said variable amount of the ambient air being used as the conveying air.

6. A device for purifying granulated material containing non-granular elements, pure granular material being partly consumed in an operating device, comprising:

hopper means for storing pure granulated material;

a suction device for drawing in ambient air as conveying air for conveying granulated material from said operating device;

a mechanism for separating non-granular elements from the granulated material with a part of said conveying air, including a pipeline with a first cross-sectional area for a flow of material consisting of unpurified granular material containing non-granular elements and conveying air, an end of said pipeline transition to a curved pipeline portion with a second cross-sectional area which is elongated and larger with respect to said first cross-sectional area, a distributing chute in the form of a sloping surface for receiving the flow of material from the second cross-sectional area and causing said material to trickle down in the form of a curtain to said storing means, an accumulation area for the flow of material leaving said distributing chute having means for conveying a portion of said ambient air transversely to the flow of material trickling down to separate said non-granular elements therefrom, and means for varying the thickness of said curtain and the amount of air flowing through said screen; and means for adding new pure granulated material to said storing means for replacing consumed granulated material without interrupting the purifying process.

7. A device as claimed in claim 6, including a storage bin for storing said new pure granulated material, and means for ensuring replenishment of granulated material from said storage bin to said storing means without interrupting operation of said operating device.

8. A device as claimed in claim 6, wherein said operating device includes a compartment enclosing a mechanism using said granulated material in operation, said compartment having said ambient air drawn thereinto; and adjustable means for using a variable part of said ambient air as conveying air for conveying said granulated material from the compartment.

9. A device as claimed in claim 6, wherein said storing means comprises an intermediate hopper, said device further including a pressure equalization line leading to said intermediate hopper, for eliminating negative pressure impeding throughput in a lower part of a feed line from said hopper to said compartment.

10. A device as claimed in claim 7, further including a suction chamber having a constant cone-shaped pile of granulated material formed in the granulated material storage bin by a partition, a lower end of a fresh granulated material delivery line of circular configuration being embedded in said cone-shaped pile at a certain distance corresponding approximately to the diameter of said delivery line.

* * * * *

UNITED STATES PATENT AND TRADEMARK OFFICE
CERTIFICATE OF CORRECTION

PATENT NO. : 5,021,149
DATED      : June 4, 1991
INVENTOR(S): Max GEISSELER

It is certified that error appears in the above-identified patent and that said Letters Patent is hereby corrected as shown below:

Column 3, line 46, "In the" should be followed by --case--.

Column 6, line 17, "transition" should be --transiting--.

Signed and Sealed this

Twentieth Day of October, 1992

Attest:

DOUGLAS B. COMER

Attesting Officer    Acting Commissioner of Patents and Trademarks